United States Patent
Duigenan et al.

(10) Patent No.: US 7,412,493 B2
(45) Date of Patent: Aug. 12, 2008

(54) PUBLISH/SUBSCRIBE MESSAGING SYSTEM

(75) Inventors: John Justin Duigenan, Bournemouth (GB); Mark E Taylor, North Baddesley (GB); Graham D Wallis, West Wellow (GB)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 10/692,144

(22) Filed: Oct. 23, 2003

(65) Prior Publication Data

US 2005/0021843 A1   Jan. 27, 2005

(30) Foreign Application Priority Data

May 16, 2003   (GB) .................................. 0311260.4

(51) Int. Cl.
*G06F 15/16*   (2006.01)

(52) U.S. Cl. ...................... 709/217; 709/227; 709/228; 709/236

(58) Field of Classification Search .................. 709/217
See application file for complete search history.

(56) References Cited

U.S. PATENT DOCUMENTS

| | | | |
|---|---|---|---|
| 6,789,077 B1 * | 9/2004 | Slaughter et al. | 707/10 |
| 6,862,594 B1 * | 3/2005 | Saulpaugh et al. | 707/10 |
| 7,080,078 B1 * | 7/2006 | Slaughter et al. | 707/10 |
| 2003/0126136 A1 * | 7/2003 | Omoigui | 707/10 |
| 2003/0195964 A1 * | 10/2003 | Mane | 709/227 |

* cited by examiner

*Primary Examiner*—Jason Cardone
*Assistant Examiner*—Nicholas R Taylor
(74) *Attorney, Agent, or Firm*—Duke W. Yee; Herman Rodriguez; Mari A. Stewart

(57) ABSTRACT

The invention relates to a message broker for managing subscription requests in a multicast messaging system. The messaging system comprises a plurality of publishers publishing information to the broker and a plurality of subscribers subscribing to information received from one or more publishers. The broker is able to receive a subscription request pointing to topic information in which the requesting subscriber is interested, the topic information defining a specific topic within a topic hierarchy. The broker is able to parse the request to determine if the request includes a wildcard and if the request does include a wildcard, the broker instructs the requesting subscriber to listen on a multicast address associated with the topic in the topic hierarchy which precedes the wildcard.

7 Claims, 5 Drawing Sheets

PUBLISH/SUBSCRIBE MESSAGING SYSTEM

FIELD OF THE INVENTION

The invention relates to the field of publish/subscribe (pub/sub) messaging. In particular the invention relates to the field of multicast pub/sub messaging.

BACKGROUND OF THE INVENTION

Publish/subscribe data processing systems have become very popular in recent years as a way of distributing data messages. Publishers are typically not concerned with where their publications are going, and subscribers are typically not interested in where the messages they receive have come from. Instead, a message broker typically assures the integrity of the message source, and manages the distribution of the message according to the valid subscriptions registered in the broker.

Publishers and subscribers may also interact with a network of brokers, each one of which propagates subscriptions and forwards publications to other brokers within the network. Therefore, when the term "broker" is used herein it should be taken as encompassing a single broker or multiple brokers working together as a network to provide brokering services.

An overview of a typical pub/sub system (e.g. WebSphere (R) MQ Integrator available from IBM Corporation) is described with reference to FIG. 1. Such a system comprises a number of publishers 10, 20, 30 publishing messages to a broker 70 on particular topics (e.g. news, weather, sport). Subscribers 40, 50, 60 register their interest in such topics via subscription requests received at the broker 70. For example, subscriber 40 may request to receive any information published on the weather, whilst subscriber 50 may desire information on the news and sport.

Note, broker 70 might be an identifiable process, set of processes or other executing component, or instead might be "hidden" inside other application code. The logical function of the broker will however exist somewhere in the network.

When broker 70 receives a message on a particular topic from a publisher, the broker determines from its list of subscriptions to whom that message should be sent. The broker then transmits the message to such subscribers.

A problem with typical pub/sub is scalability. One copy of a message is sent by the broker to each subscriber who has registered an interest in the topic to which the message relates. Thus if one hundred subscribers desire to receive information on the topic of sport, one hundred copies of each message relating to sport are sent out. Thus the whole network of subscribers might be flooded.

For this reason, multicast pub/sub was invented. This scales much better since the network determines the minimum/most efficient number of message copies necessary in order to fulfil subscribers' requests.

Unlike point-to-point TCP/IP socket-based pub/sub (where each subscriber listens on its own IP address for messages), subscribers in a multicast system listen on specific multicast addresses. Any number of subscribers may listen on the same multicast address.

In a pub/sub system, there is potentially an infinite number of topics. However the range of multicast addresses available is limited. Further, most systems typically support only a subset of this limited range. Thus there is the very real problem of how to map the "topic space" to the available multicast addresses.

One well-known pub/sub system (Tibco's Rendez-Vous) avoids the problem by having all subscribers listen on a single multicast address (whatever their subscription requests). Thus each subscriber receives all publications. Software on each subscriber is then used to filter out information on topics in which the subscriber has no interest. Such a system places a very heavy workload on the network and also the subscribers themselves.

Thus there is a need in the industry for an efficient way of mapping the limited range of multicast addresses available to an infinite topic space and for communicating a single multicast address per subscription request.

SUMMARY OF THE INVENTION

Accordingly the invention provides a message broker for managing subscription requests in a multicast messaging system comprising a plurality of publishers publishing information to the broker and a plurality of subscribers subscribing to information received from one or more publishers, the broker comprising: means for receiving a subscription request pointing to topic information in which the requesting subscriber is interested, the topic information defining a specific topic within a topic hierarchy; means for parsing said request to determine if said request includes a wildcard; and means, responsive to determining that said request does include a wildcard, for instructing the requesting subscriber to listen on a multicast address associated with the topic in the topic hierarchy which precedes said wildcard.

Note, if no topic precedes a wildcard (e.g. *\weather), then the root topic is implicitly the preceding topic. Thus the above is meant to encompass this situation.

Note, subscription requests may include an explicit topic hierarchy (e.g. news\politics\leaders\Tony Blair). Alternatively a hierarchy may be implicit within the subscription request—e.g. if a subscription requests all information about the weather, then the implicit hierarchy might be "*\weather".

Preferably it is possible to assign the multicast address to the preceding topic. The multicast address may be inherited from a parent topic.

Wildcard subscription requests were, prior to the solution provided by the present invention, problematic. They begged the question as to which multicast address a subscriber requesting a wildcard subscription should be told to listen on in order to receive the desired information.

The invention solves this problem by the broker returning a single multicast address that is associated with the best-matching topic string up to the wildcard in the subscription (i.e. the address associated with topic information immediately preceding the wildcard).

According to one aspect, there is provided a method for managing subscription requests in a multicast messaging system, the messaging system comprising a plurality of publishers publishing information to a broker and a plurality of subscribers subscribing to information received from one or more publishers, the method comprising the steps of: receiving a subscription request pointing to topic information in which the requesting subscriber is interested, the topic information defining a specific topic within a topic hierarchy; parsing said request to determine if said request includes a wildcard; and responsive to determining that said request does include a wildcard, for instructing the requesting subscriber to listen on a multicast address associated with the topic in the topic hierarchy which precedes said wildcard.

According to another aspect, the invention provides a computer program for managing subscription requests in a multicast messaging system, the messaging system comprising a plurality of publishers publishing information to a broker and a plurality of subscribers subscribing to information received from one or more publishers, the computer program comprising program code means adapted to perform, when said program is run on a computer, the steps of: receiving a subscription request pointing to topic information in which the requesting subscriber is interested, the topic information defining a specific topic within a topic hierarchy; parsing said request to determine if said request includes a wildcard; and responsive to determining that said request does include a wildcard, for instructing the requesting subscriber to listen on a multicast address associated with the topic in the topic hierarchy which precedes said wildcard.

According to another aspect, the invention provides a multicast messaging system for managing subscription requests, the system comprising: a message broker; a plurality of publishers publishing information to the broker; a plurality of subscribers subscribing to information received from one or more publishers, the subscribers comprising: means for registering subscription requests with the broker, the broker comprising: means for receiving a subscription request pointing to topic information in which the requesting subscriber is interested, the topic information defining a specific topic within a topic hierarchy; means for parsing said request to determine if said request includes a wildcard; and means, responsive to determining that said request does include a wildcard, for instructing the requesting subscriber to listen on a multicast address associated with the topic in the topic hierarchy which precedes said wildcard.

BRIEF DESCRIPTION OF THE DRAWINGS

A preferred embodiment of the present invention will now be described, by way of example only, and with reference to the following drawings.

DETAILED DESCRIPTION

When a broker in a multicast system receives a subscription request from a subscriber, the broker instructs that subscriber of the multicast address they should listen on in order to receive publications pertaining to their request.

As previously discussed, the number of multicast addresses is very limited, whilst the number of topics available may be far greater. It is therefore very unlikely that there will be sufficient multicast addresses to assign unique addresses across an entire topic space. There is also the difficulty that publishers can invent new topics on-the-fly.

The first problem therefore is how the broker should assign multicast addresses to its topic space.

The topic space is preferably defined by the publications/subscription requests received at the broker. Each such request is parsed into a representation against which publications can be matched. For the sake of simplicity, the topics in a topic space may be thought of as forming a tree structure, with each topic forming a node within this structure. Part of the tree structure is typically created at system setup based on the broker's knowledge as to the kind of messages that it is likely to receive. As new subscription requests are received/new types of publication are received, so the tree grows. Subscribers are associated with relevant nodes in order that they can receive information pertaining to their subscription requests.

Figure 1:
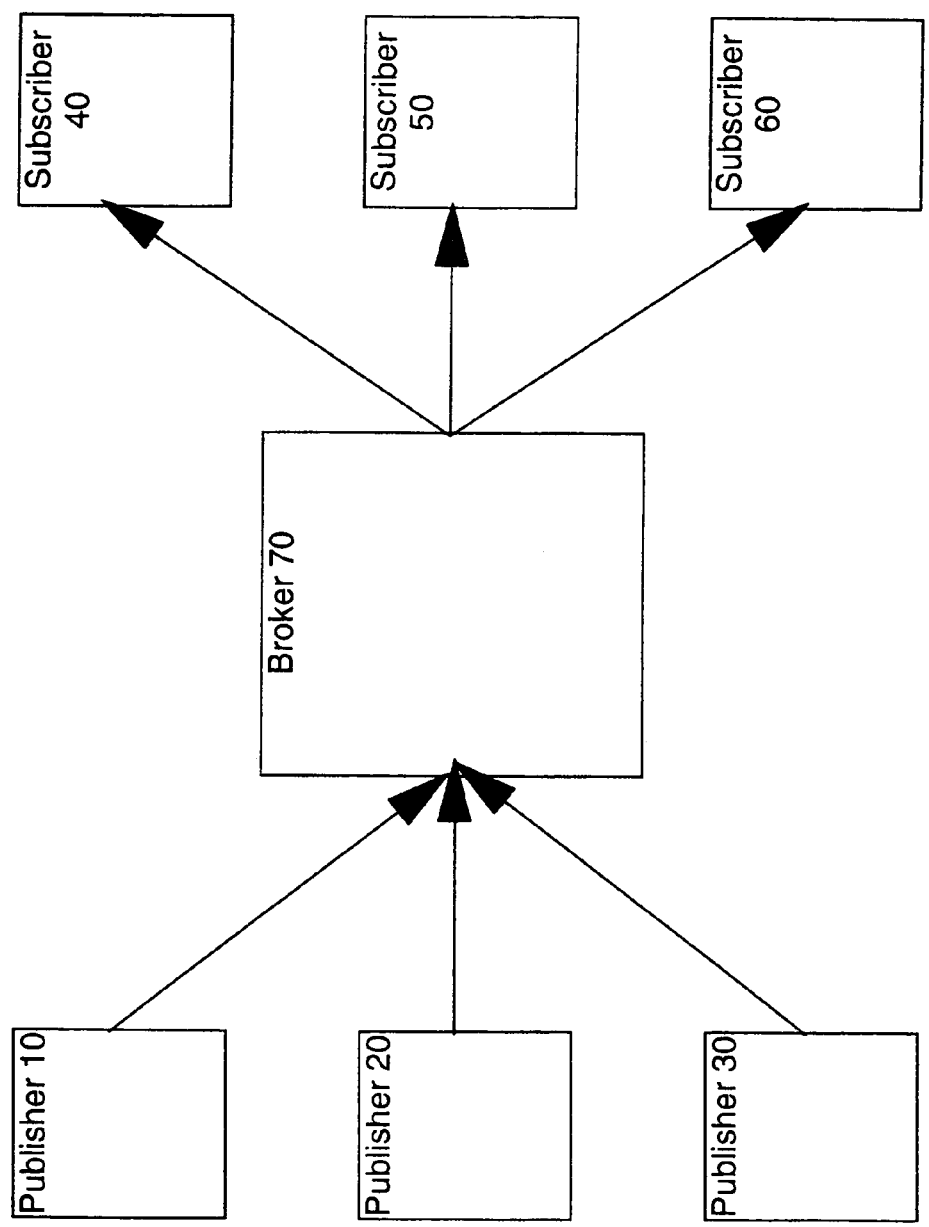
FIG. 1 shows an overview of a typical publish/subscribe messaging system according to the prior art.
Figure 2:
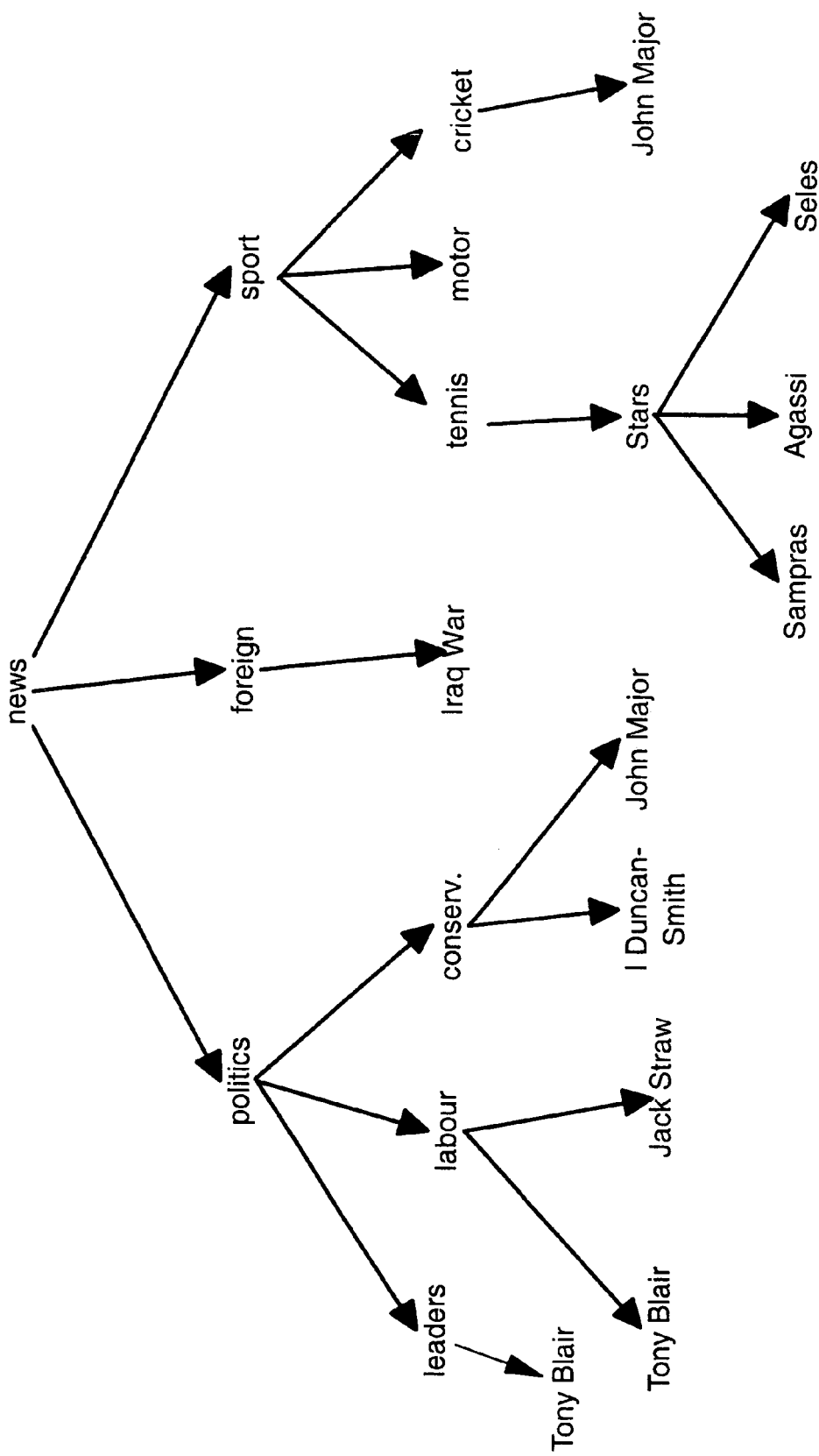
FIG. 2 depicts an example topic tree.

FIG. 2 depicts an example topic tree. From this figure it can be seen that the main topic about which information is published is "news". This topic can be divided into three categories—politics news, foreign news and sports news. Each category can then be further subdivided. (For example, information is published on the tennis stars Pete Sampras, Andre Agassi and Monica Seles.)

When a publication is received at the broker, it is parsed against the tree structure in order to match subscription requests registered with the broker. Such requests may specify exactly which part of the topic tree a particular subscriber is interested in. For example, a subscriber may submit the following subscription to the broker: "news\politics\Labour\Jack Straw".

In order to instruct the subscriber which multicast address they should listen on in order to receive news on Jack Straw, the broker should preferably have assigned multicast addresses to the topic space.

According to a preferred embodiment of the present invention, each topic of the tree is assigned, as an attribute, a multicast address (e.g. an IP address). If the attribute is not set, then the particular topic, preferably inherits from its parent. Dynamically created topics (which will not show up in a management tool) also preferably inherit from a parent topic. Addresses may of course have to be reused in order to cover the complete topic space. Thus filtering may be necessary at the subscriber to remove unwanted topic information. Such filtering is however greatly reduced compared with previous solutions.

Another way of saving on mulitcast addresses is to assign addresses to levels of the tree (as opposed to assigning addresses to individual topic nodes). Again filtering may be required at the subscriber.

Using the scheme/variations thereof, described in the previous two paragraphs, allows network administrators to easily determine how far (in a network topology sense) topics are to be transmitted. In other words, network administrators may configure how many routers and gateways publications are transmitted through. For example, it is possible to configure a router to accept certain multicast addresses, but not others.

Network administrators may also configure exactly which nodes inherit from their parent, which nodes reuse addresses etc.

Figure 3:
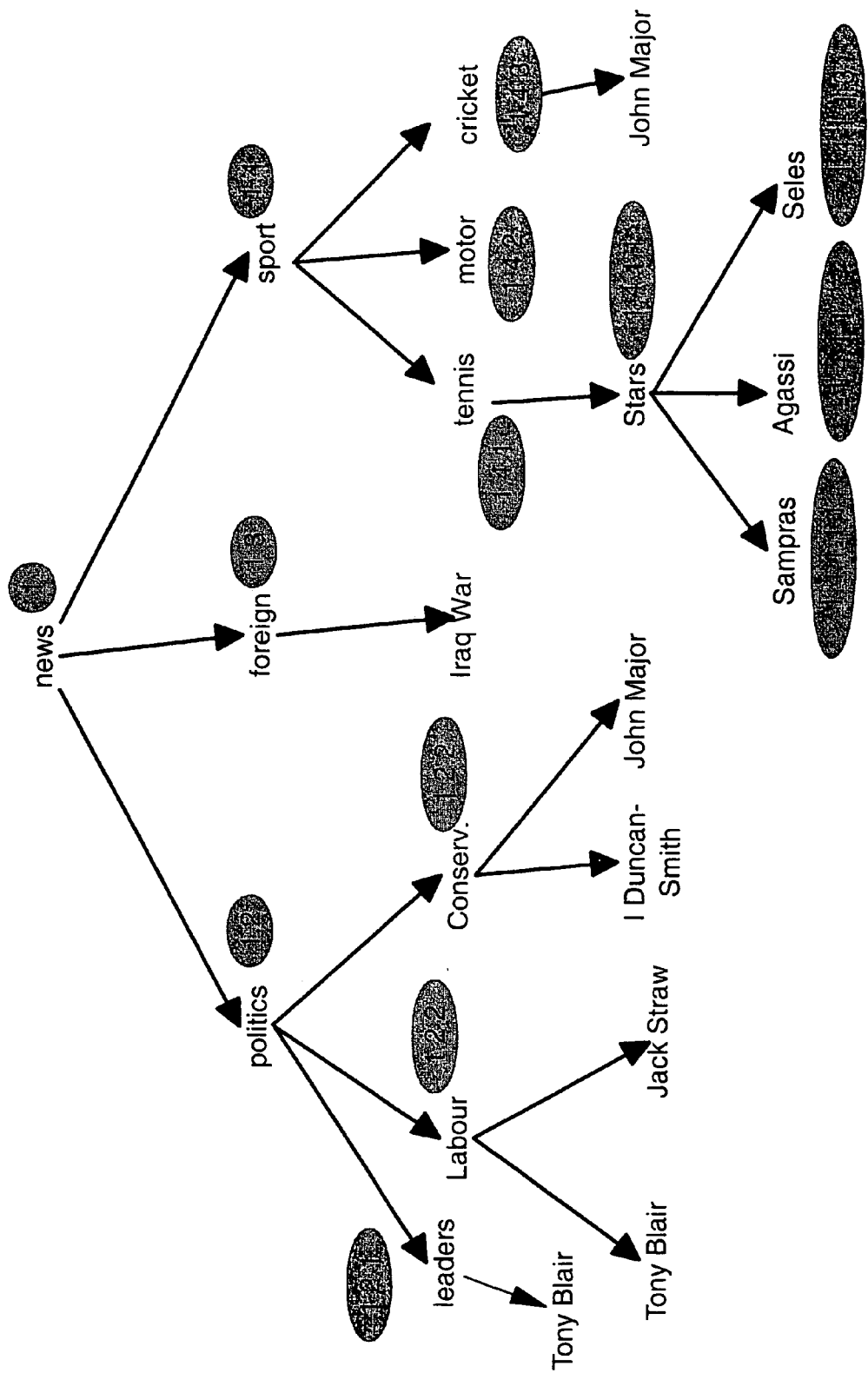
FIG. 3 shows the topic tree of FIG. 2 with exemplary multicast addresses assigned in accordance with a preferred embodiment of the present invention.

FIG. 3 shows the topic space of FIG. 2 with exemplary multicast addresses assigned in accordance with a preferred embodiment of the present invention. It will be appreciated that the addresses used in FIG. 3 are by way of example only—they are not meant to be real multicast addresses.

From this figure, it can be seen, for example, that the root topic (news) is assigned address 1. Politics has an address of 1.2 and its subcategory of leaders has an address of 1.2.1. Another of politics subtopics "Labour has an address of 1.2.2. The topics which descend from Labour (i.e. Tony Blair and Jack Straw) do not however have addresses assigned. Thus these topics inherit their parents address (i.e. . . . 1.2.2). Further the Conservative topic has the same address as the Labour topic. This conserves multicast addresses.

Thus returning to the previous example subscription request of "news\politics\labour\Jack Straw", the originator of this request will be told to listen on multicast address 1.2.2

(i.e. the address associated with the Labour topic since the Jack Straw topic does not have its own address). This subscriber will thereby receive all publications about Jack Straw. The subscriber will of course also receive other information about the Labour Party (including that about Tony Blair as part of the Labour Party). Further the subscriber will receive information about the Conservative party (including that about Ian Duncan-Smith and John Major). However the amount of unwanted material should be manageable and can be filtered out by software running on the subscriber.

Using the scheme proposed above it is relatively clear which multicast address a subscriber, specifying explicitly the topic of interest, should be told to listen on. Unfortunately subscribers do not always use such explicit requests. Wildcards subscriptions are frequently used. For example, the following request may be received: "news\sport\tennis\*" (where * denotes a wildcard). Such a subscription is a request for all news about the topic of tennis. Thus according to the topic space defined in FIGS. 2 and 3, the subscriber should receive publications about tennis stars—i.e. about Sampras, Agassi, Seles and information about any other tennis stars received by the broker.

Note a wildcard does not have to appear at the end of the subscription request string. For example, the following request might be received: "news\*\*\John Major". Such a request should return information relating to John Major as a member of the Conservative Party and John Major as a fan of cricket.

Wildcard subscription requests were, prior to the solution provided by the present invention, problematic. They begged the question as to which address a subscriber requesting a wildcard subscription should be told to listen on in order to receive the desired publications.

Returning to the first wildcard subscription example of "new\sport\tennis\*". One possible solution is to tell the subscriber to listen on each address covered by the wildcard. With the example given, the subscriber would be told to listen on addresses 1.4.1, 1.4.1.1, 1.4.1.1.1, 1.4.1.1.2 and 1.4.1.1.3 (i.e. the addresses associated with the topic nodes in the tennis subtree). Thus the subscriber would have to listen on 5 addresses and consequently 5 copies of a message fulfilling the subscriber's request would have to be propagated over the network. It will be appreciated that with a large number of subscription patterns including wildcards (as frequently occurs in a production pub/sub system), the situation would quickly become unmanageable. This is especially true with a large number of subscribers.

The invention preferably solves this problem by the broker returning a single multicast address that is associated with the best-matching topic string up to the first wildcard in the subscription. For example, with the wildcard subscription request of "new\sport\tennis\*", the broker returns the multicast address associated with the tennis topic (i.e. 1.4.1). By way of a further example, with a wildcard subscription request of "news\politics\*\Tony Blair", the broker returns the address associated with the politics topic (i.e. 1.2).

In this way, the required aim is achieved. Subscribers listen on a single address (even when their subscription request includes a wildcard) and thus the network should not be flooded. By listening on the single address, the subscriber receives all the information that they would have received had they listened on multiple addresses (as described in the inferior solution above). They may of course receive some information that they do not want, but this can be filtered out subscriber-side. Since network traffic is reduced, this tradeoff is considered worthwhile.

Figure 4A:
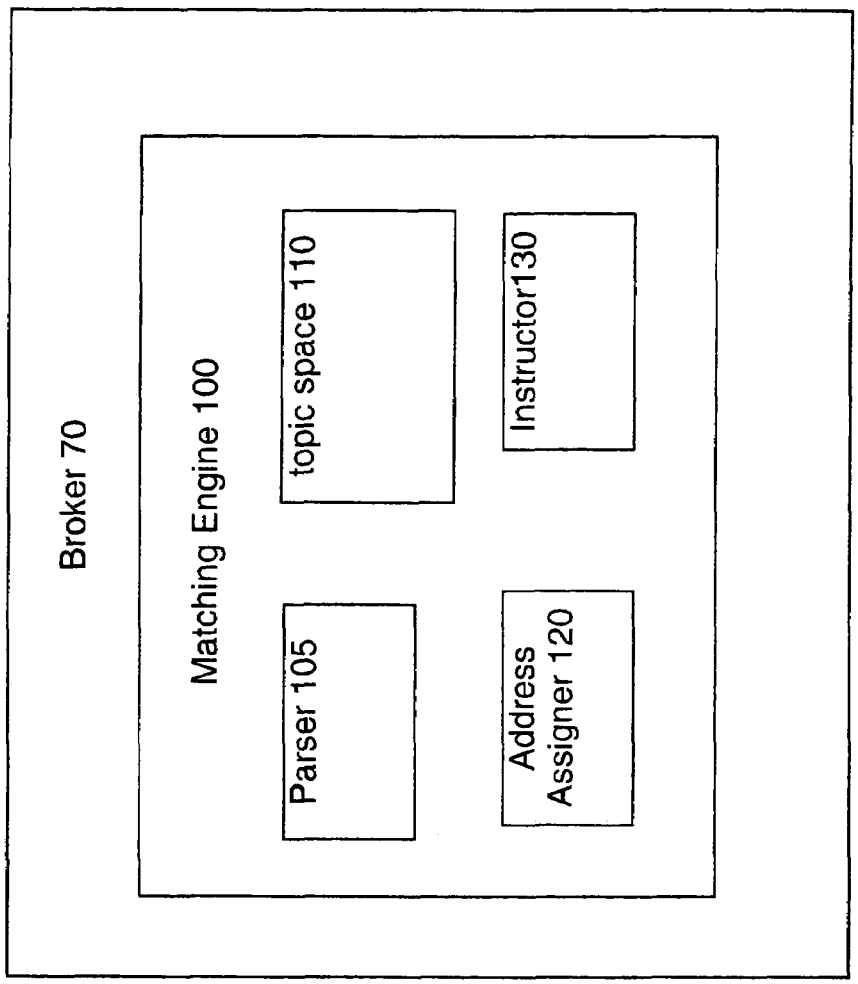
FIG. 4a illustrates pertinent components of a message broker according to a preferred embodiment.
Figure 4B:
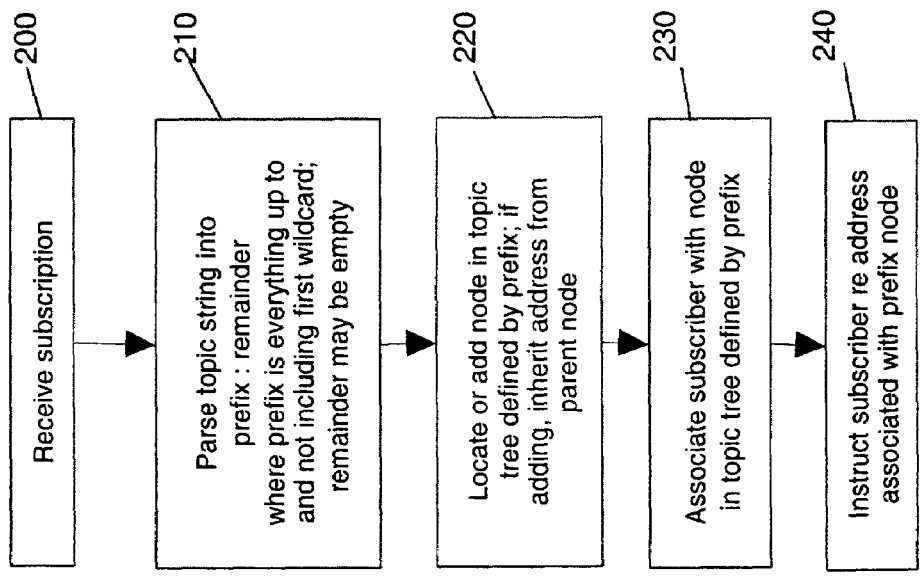
FIG. 4b is a flowchart illustrating the processing of the present invention in accordance with a preferred embodiment.

FIG. 4a illustrates pertinent components of a message broker according to a preferred embodiment of the present invention. FIG. 4b is a flowchart illustrating the processing of the present invention in accordance with a preferred embodiment. FIGS. 4a and 4b should be read in conjunction with one another.

The message broker 70 comprises a matching engine 100. It is the matching engine 100 which receives the subscription requests (step 200) and parses each one at step 210 (using parser component 105). A topic string received as a subscription request is parsed into a "prefix" and a "remainder". The "prefix" constitutes everything up to and not including the first wildcard (assuming a wildcard exists). The "remainder" may be empty.

At step 220, the node in the topic tree defined by the prefix (i.e. the node representing the topic immediately preceding the wildcard) is located (if it already exists) or is added into the topic tree (if it doesn't). If the node is added in, then this node inherits its parent's multicast address.

The subscriber can then be associated with the node in the topic tree which is defined by the prefix (step 230) (the parser component may also action this).

At step 240, the subscriber is instructed, via instructor component 130, how to receive the information it requests (see below).

Address assignor component 120 assigns multicast addresses to the nodes in the topic tree. The methodology applied to assign these addresses can be configured by a network administrator.

The address assigned by the assignor component 120 is used by the instructor component 130 to instruct the subscriber as to which is the appropriate multicast address to listen on. (In other words once a subscriber has been associated with a node in the tree structure, the instructor component 130 interrogates the tree to determine the multicast address associated with that node.)

It will be appreciated that, via this method, subscribers may receive information in which they are not interested. For example a subscriber wishing to receive information about Tony Blair (via the subscription news\politics\*\Tony Blair) will be told via component 130 to listen on the multicast address associated with politics (i.e. 1.2). This subscriber will thus receive information not only about Tony Blair but relating to all other topics descending from the politics topic node (e.g. Labour\Jack Straw, Conservative\Ian Duncan-Smith etc.) As previously mentioned, filtering can be done at the subscriber to remove such unwanted information and this is a worthwhile tradeoff for increased network efficiency. Further whilst messages will be transmitted by the broker on all of the multicast addresses communicated to the subscribers, the number of transmissions is bounded by the depth of the topic tree. Thus the situation is manageable.

Although this description has used a single asterisk to denote a full component in the tree, the same technique can be used for any wildcard character recognised in any (single or multiple) place. For example, a subscriber to the topic "news\pol*s*\*\????Blair", would be given the address of the "news" topic.

Note, in the example above, a subscriber will be told to listen on the address associated with the news node.

Note, if a wildcard does not exist in a subscription request, then the request is not broken into a "prefix" and a "remainder" and the subscriber is simply associated with the node defined by request. For example, a request of news\politics\labour would result in the requesting subscriber being associated with the labour node in the topic tree (i.e. being told to listen on address 1.2.2).

What is claimed is:

1. An apparatus for managing subscription requests in a multicast messaging system comprising a plurality of publishers publishing information to a broker and a plurality of subscribers subscribing to information received from one or more publishers, the apparatus comprising:

a computer, wherein the computer comprises:
a matching engine, wherein the matching engine receives a subscription request pointing to topic information in which a requesting subscriber is interested, the topic information defining a specific topic within a topic hierarchy, parses the subscription request to determine if the request includes a wildcard, wherein a topic string received as the subscription request is parsed into a prefix and a remainder, wherein the prefix comprises everything in the topic string preceding the wildcard, locates a node in the topic tree defined by the prefix, wherein the node represents a topic immediately preceding the wildcard, and instructs the requesting subscriber to listen on a multicast address associated with the topic in the topic hierarchy which precedes the wildcard by associating the subscriber with the node in the topic tree, wherein the node is defined by the prefix.

2. The apparatus of claim 1 comprising:
means for assigning the multicast address to the topic in the topic hierarchy which precedes the wildcard.

3. The apparatus of claim 2, wherein the multicast address for the topic in the topic hierarchy which precedes the wildcard is inherited from parent topic information.

4. A computer program embedded on a computer readable medium comprising program code adapted to perform, managing subscription requests in a multicast messaging system when said program code is run on a computer, the messaging system comprising a plurality of publishers publishing information to a broker and a plurality of subscribers subscribing to information received from one or more publishers, the computer program comprising program code adapted to perform, the steps of:

receiving a subscription request pointing to topic information in which a requesting subscriber is interested, the topic information defining a specific topic within a topic hierarchy;

parsing the subscription request to determine if the request includes a wildcard, wherein a topic string received as the subscription request is parsed into a prefix and a remainder, wherein the prefix comprises everything in the topic string preceding the wildcard;

locating a node in the topic tree defined by the prefix, wherein the node represents a topic immediately preceding the wildcard; and instructing the requesting subscriber to listen on a multicast address associated with the topic in the topic hierarchy which precedes the wildcard by associating the subscriber with the node in the topic tree, wherein the node is defined by the prefix.

5. The computer program of claim 4, wherein the program code means is also adapted to perform the following step when said program is run on a computer:

assigning the multicast address to the topic in the topic hierarchy which precedes the wildcard.

6. The computer program of claim 5, wherein the multicast address for the topic in the topic hierarchy which precedes the wildcard is inherited from parent topic information.

7. A data processing system for managing a multicast messaging system for managing subscription requests, the data processing system comprising:

a bus;

a memory connected to the bus, wherein the memory includes computer program code; and a processor coupled to the bus, wherein the processor executes the computer program code to a message broker; a plurality of publishers publishing information to the message broker;

a plurality of subscribers subscribing to information received from one or more publishers, the subscribers comprising:

the message broker, the message broker comprising:

a matching engine, wherein the matching engine receives a subscription request pointing to topic information in which a requesting subscriber is interested, the topic information defining a specific topic within a topic hierarchy;

a parser, wherein the parser parses the subscription request to determine if the request includes a wildcard, wherein a topic string received as the subscription request is parsed into a prefix and a remainder, wherein the prefix comprises everything in the topic string preceding the wildcard and, wherein the parser locates a node in the topic tree defined in the prefix, wherein the node represents a topic immediately preceding the wildcard; and, an instructor, wherein the instructor instructs the requesting subscriber to listen on a multicast address associated with the topic in the topic hierarchy which precedes the wildcard by associating the subscriber with the node in the topic tree, wherein the node is defined by the prefix.

* * * * *